US006929477B2

(12) United States Patent
Fukushima

(10) Patent No.: US 6,929,477 B2
(45) Date of Patent: Aug. 16, 2005

(54) DIRECTORY MANAGEMENT DEVICE AND METHOD

(75) Inventor: Daichi Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 10/101,844

(22) Filed: Mar. 21, 2002

(65) Prior Publication Data

US 2003/0091963 A1 May 15, 2003

(30) Foreign Application Priority Data

Aug. 1, 2001 (JP) ........................................ 2001-233625

(51) Int. Cl.$^7$ ............................................... G09B 19/00
(52) U.S. Cl. ........................ 434/118; 434/350; 434/362
(58) Field of Search ................... 434/118, 169, 434/307 R, 308, 323, 350, 362, 365; 709/102, 202, 203, 226, 223; 455/422.1, 445, 517; 701/35; 705/1; 715/512; 717/100; 370/352

(56) References Cited

U.S. PATENT DOCUMENTS

| | | | | |
|---|---|---|---|---|
| 5,611,050 A | * | 3/1997 | Theimer et al. ............ 709/202 |
| 5,809,415 A | * | 9/1998 | Rossmann ................ 455/422.1 |
| 6,311,195 B1 | * | 10/2001 | Hachiya et al. .............. 715/512 |
| 6,473,794 B1 | * | 10/2002 | Guheen et al. ............. 709/223 |
| 6,477,563 B1 | * | 11/2002 | Kawamura et al. ......... 709/202 |
| 6,560,456 B1 | * | 5/2003 | Lohtia et al. ................ 455/445 |
| 2001/0003191 A1 | * | 6/2001 | Kovacs et al. .............. 709/226 |
| 2002/0039907 A1 | * | 4/2002 | McKenna et al. .......... 455/517 |
| 2002/0087620 A1 | * | 7/2002 | Rouse et al. ................ 709/203 |
| 2002/0116698 A1 | * | 8/2002 | Lurie et al. ................. 717/100 |
| 2002/0126652 A1 | * | 9/2002 | Ha et al. ..................... 370/352 |
| 2002/0161590 A1 | * | 10/2002 | Sakakibara et al. ............ 705/1 |
| 2003/0109973 A1 | * | 6/2003 | Hensey et al. ................ 701/35 |
| 2003/0115240 A1 | * | 6/2003 | Cho ........................... 709/102 |

* cited by examiner

Primary Examiner—Joe H. Cheng
(74) Attorney, Agent, or Firm—Staas & Halsey LLP

(57) ABSTRACT

A directory management method, and a device, and a program for the directories management, and storage medium for the program directories using terminal equipment connected to a client-server type network. receive a user's request to use a directory, locate the directory on the basis of time of the user's request to use the directory, and enable the user to use the located directory.

16 Claims, 15 Drawing Sheets

FIG. 2A

EXAMPLE OF STUDENT INFORMATION DATABASE — 51

| NO. | FAMILY NAME | PERSONAL NAME | SEX | GRADE | CLASS | SERIAL NUMBER | USER ID |
|---|---|---|---|---|---|---|---|
| 1 | AOKI | DAISHI | MALE | 4TH | 1 | 1 | ST000001 |
| 2 | ISHII | CHIKA | FEMALE | 4TH | 1 | 2 | ST000002 |
| 3 | UCHIDA | TOMOYUKI | MALE | 4TH | 1 | 3 | ST000003 |
| 4 | EDA | SAORI | FEMALE | 4TH | 1 | 4 | ST000004 |

FIG. 2B

EXAMPLE OF TIME TABLE INFORMATION DATABASE — 52

- TIME-BASED TIME TABE INFORMATION D/AT BASE

| NO. | GRADE | PERIOD | START TIME | END TIME | 521 |
|---|---|---|---|---|---|
| 1 | 4TH | 1ST PERIOD | 8:50 | 9:30 | |
| 2 | 4TH | 2ND PERIOD | 9:40 | 10:20 | |
| 3 | 4TH | 3RD PERIOD | 10:30 | 11:10 | |
| 4 | 4TH | 4TH PERIOD | 11:20 | 12:00 | |
| 5 | 4TH | 5TH PERIOD | 13:10 | 13:50 | |
| 6 | 4TH | 6TH PERIOD | 14:00 | 14:40 | |

- SUBJECT-BASED TIME TABE INFORMATION DATA BASE        522

| NO. | GRADE | CLASS | DAY OF THE WEEK | PERIOD | SUBJECT |
|---|---|---|---|---|---|
| 1 | 4TH | 1 | MONDAY | 1ST PERIOD | ARITHMETIC |
| 2 | 4TH | 1 | MONDAY | 2ND PERIOD | SOCIAL STUDIES |
| 3 | 4TH | 1 | MON DAY | 3RD PERIOD | JAPANESE |
| 4 | 4TH | 1 | MONDAY | 4TH PERIOD | PHYSICAL EDUCATION |
| 5 | 4TH | 1 | MONDAY | 5TH PERIOD | NATURAL SCIENCE |
| 6 | 4TH | 1 | MONDAY | 6TH PERIOD | HOMEROOM ACTIVITY |

FIG. 2C

EXAMPLE OF LINKAGE INFORMATION DATABASE — 56

| NO. | TOPIC | GRADE | CLASS | USER | LOCAL | EQUIPMENT ID |
|---|---|---|---|---|---|---|
| 1 | subj0001/topic002 | grade004/ | clas0401/ | ST000001/ | C:¥autodir | 24-44-35-71-39-e0 |
| 2 | subj0001/topic004 | grade003/ | clas0302/ | ST000016/ | C:¥autodir | 0e-20-54-72-17-f2 |

FIG. 3A

EXAMPLE OF TIME TABLE ALTERATION INFORMATION DATABASE  53

| NO. | YEAR | MONTH | DAY | PERIOD | GRADE | CLASS | SUBJECT AFTER ALTERATION |
|---|---|---|---|---|---|---|---|
| 1 | 2001 | APRIL | 23 | 2ND PERIOD | 4TH | 1 | PHYSICAL EDUCATION |
| 2 | 2001 | APRIL | 23 | 4TH PERIOD | 4TH | 1 | SOCIAL STUDIES |
| 3 | 2001 | MAY | 10 | 3RD PERIOD | 5TH | 3 | MUSIC |
| 4 | 2001 | MAY | 10 | 3RD PERIOD | 6TH | 1 | NATURAL SCIENCE |

FIG. 3B

EXAMPLE OF SUBJECT-TOPIC INFORMATION DATABASE  54

- SUBJECT BASED SUBJECT-TOPIC INFORMATION DATABASE  541

| NO. | SUBJECT | 1ST GRADE | 2ND GRADE | 3RD GRADE | 4TH GRADE | 5TH GRADE | 6TH GRADE |
|---|---|---|---|---|---|---|---|
| 1 | JAPANESE | 1 | 1 | 1 | 1 | 1 | 1 |
| 2 | ARITHMETIC | 1 | 1 | 1 | 1 | 1 | 1 |
| 3 | SOCIAL STUDIES | 0 | 0 | 1 | 1 | 1 | 1 |
| 4 | DOMESTIC SCIENCE | 1 | 1 | 0 | 0 | 0 | 0 |

TOPIC-BASED SUBJECT-TOPIC INFORMATION DATABASE  542

| NO. | GRADE | SUBJECT | TOPIC NAME | START DATE | END DATE |
|---|---|---|---|---|---|
| 1 | 4TH | JAPANESE | LET'S MAKE VERSES. | 4/16/2001 | 4/23/2001 |
| 2 | 4TH | ARITHMETIC | CONGRUENCE OF FIGURES | 5/7/2001 | 5/18/2001 |
| 3 | 4TH | NATURAL SCIENCE | BIRTH OF OUR PLANET | 4/23/2001 | 4/27/2001 |

FIG. 3C

EXAMPLE OF DIRECTORY INFORMATION DATABASE  55

| NO. | TYPE | LABEL | DIRECTORY NAME |
|---|---|---|---|
| 1 | GRADE | 4TH | grade004 |
| 2 | CLASS | CLASS 1 OF 4TH GRADE | clas0401 |
| 3 | SUBJECT | NATURAL SCIENCE | subj0001 |
| 4 | SUBJECT | ARITHMETIC | subj0002 |
| 5 | TOPIC | LET'S MAKE VERSES. | topic001 |
| 6 | TOPIC | CONGRUENCE OF FIGURES | topic002 |
| 7 | TOPIC | BIRTH OF OUR PLANET | topic003 |
| 8 | USER | ST000001 | ST000001 |

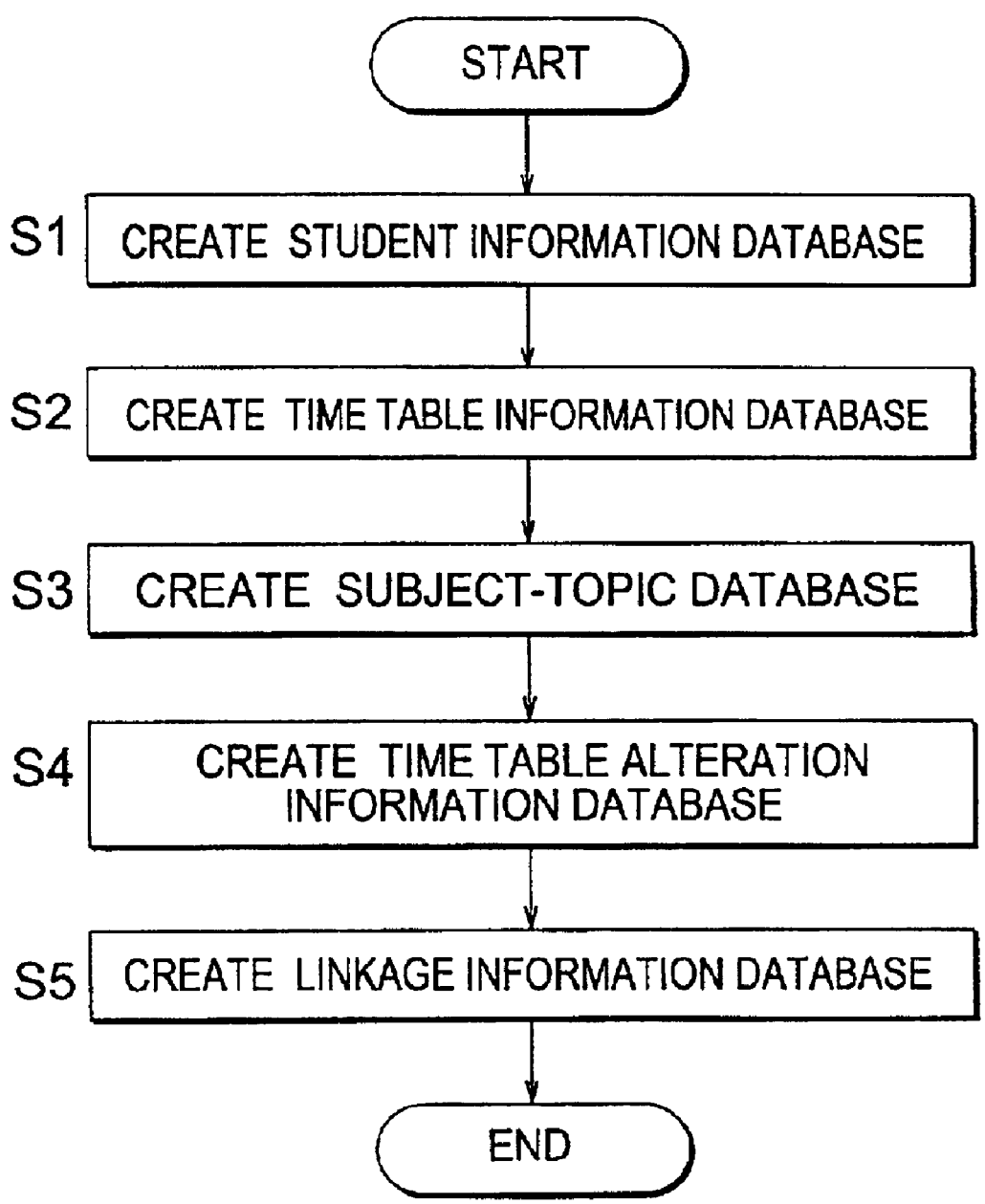

FIG. 7A

CREATION OF NEW DIRECTORY

⦿ SUBJECT  ○ TOPIC  ○ STUDENT

SUBJECT: [DOMESTIC SCIENCE]
GRADE: ☐ 1ST  ☐ 2ND  ☐ 3RD
       ☐ 4TH  ☑ 5TH  ☑ 6TH

[REGISTRATION] [CANCEL]

FIG. 7B

CREATION OF NEW DIRECTORY

○ SUBJECT  ⦿ TOPIC  ○ STUDENT

GRADE: [4TH ▼]
SUBJECT: [NATURAL SCIENCE ▼]
TOPIC: [ACIDITY & ALKALINITY]

[REGISTRATION] [CANCEL]

FIG. 7C

CREATION OF NEW DIRECTORY

○ SUBJECT  ○ TOPIC  ⦿ STUDENT

GRADE: [4TH ▼]
CLASS: [1 ▼]
STUDENT: [OHKI YOSHIO]

[REGISTRATION] [CANCEL]

FIG. 9

LOG-IN

USER ID: ST000001

PASSWORD: ********

[ LOG IN ]  [ CANCEL ]

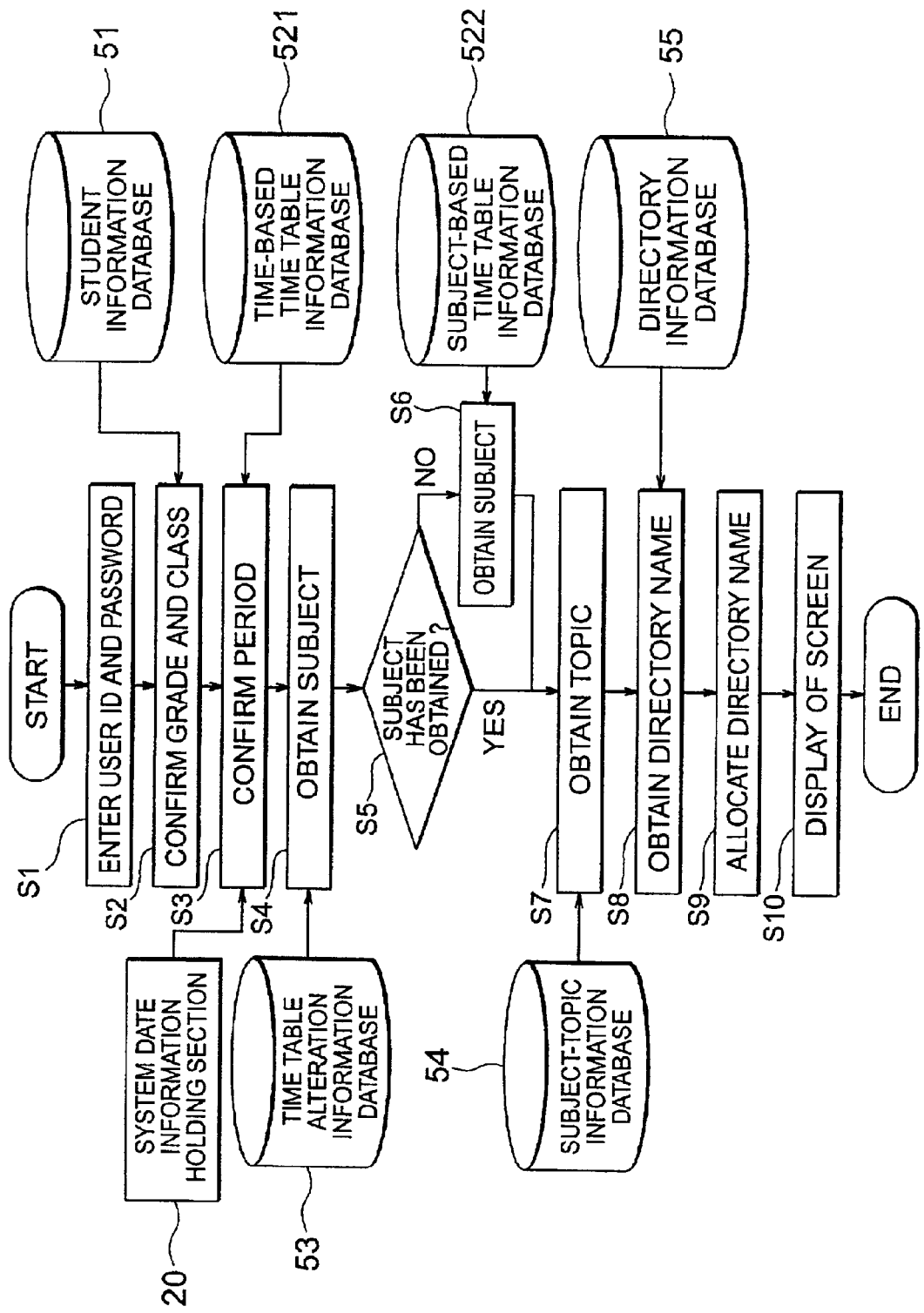

| LABEL | ACTUAL DIRECTORY |
|---|---|
| USER | ST000001/subj0001/topic003/ |
| CLASS | clas0401/subj0001/topic003/ |
| GRADE | grade004/subj0001/topic003/ |

| DIRECTORIES ON VIRTUAL STRUCTURE | ACTUAL DIRECTORIES |
|---|---|
| 4TH GRADE/ | grade004/subj0001/topic003/ |
| 4TH GRADE/CLASS 1 | clas0401/subj0001/topic003/ |
| 4TH GRADE/CLASS 1 /AOKI DAISHI/ | ST000001/subj0001/topic003/ |
| 4TH GRADE/CLASS 1 /ISHII CHIKA/ | ST000002/subj0001/topic003/ |
| 4TH GRADE/CLASS 1 /UCHIDA TOMOYUKI/ | ST000003/subj0001/topic003/ |
| 4TH GRADE/CLASS 1 /EDA SAORI/ | ST000004/subj0001/topic003/ |

| ICON ON SCREEN | DIRECTORY ON SERVER | DIRECTORY ON MOBILE TERMINAL EQUIPMENT |
|---|---|---|
| USER | ST000001/subj0001/topic002/ | C:¥autodirST |
| CLASS | clas0401/subj0001/topic002/ | C:¥autodirCL |
| GRADE | grade004/subj0001/topic002/ | C:¥autodirGR |

DIRECTORY MANAGEMENT DEVICE AND METHOD

CROSS REFERENCE TO RELATED APPLICATION

This application claims the priority of Japanese Patent Application No. 2001-233625, filed Aug. 1, 2001 in Japan, the contents of which are incorporated herein by reference.

BACKGROUND OF THE INVENTION

1. Field of the Invention

The present invention relates to a directory management method, and a device, and a program for the directories management, and storage medium for the program directories using terminal equipment connected to a client-server type network. The present invention can also be applied to similar applications using mobile communication terminal equipment, such as cellular phones, connected to a network.

2. Description of the Related Art

With computers becoming increasingly popular in educational institutions in recent years, various types of learning systems have been developed which enable learners (including elementary school children, junior and senior high school students, university and college students, and other students learning in vocational schools, trainees in corporate training and education institutions, and students in preparatory schools) to actually operate computers in their classes to get access to files relating to the contents of subjects they are learning, or store notes of their learning results in the learning system. In such a system, a hierarchical directory structure is generally employed to organize and store files by grade, subject or student for referring them later.

As means for facilitating the understanding of hierarchical directory structures, there are methods of identifying directories using linguistic labels or metaphors, such as "drawers," as commonly found in commercially available image management systems.

It is extremely difficult, however, for learners, particularly beginners at computers, who have to operate their computers in classes in educational institutions, to understand hierarchical directory structures. Even when linguistic labels or metaphors such as "drawers" are used, the knowledge of hierarchical structures is essential.

Lack of the knowledge of hierarchical directory structures could lead to the following problems. That is, a learner may not quickly find the directory asked by the instructor to find and open during the lesson, or may store a file prepared by him in a wrong directory. As a result, not only the learner's learning speed may be lowered, but also the progress of learning of the entire class may be obstructed. In addition, when there are a plurality of directories to be opened or directories to which files are to be saved, the situation could become more serious.

At the same time, instructors, including teachers and trainers, also have the problem of file management. In an educational institution equipped with computers, the instructor must create necessary directories for learners to use computers or maintain proper lesson management.

Under such circumstances, cases creating directories having the same name under a plurality of parent directories happen frequently. When preparing topics for a subject, for example, topic directories must be provided under each learner's directory where each learner can maintain his own files on those topics. To keep files to a particular class, topic directories of the same name must be provided below each class' directory. Furthermore, topic directories of the same name must also be provided below each grade directory to keep files that are used commonly in a grade. Preparing a number of directories for each directory would involve quite burdensome operations for instructors.

Similarly it is time-consuming and inefficient to save files of the same name in a plurality of directories of the same name, or to find a particular directory one by one from an actual directory structure.

SUMMARY OF THE INVENTION

To overcome the aforementioned problems, the present invention is intended to automatically locate and present necessary directories to the instructor or learner without the need for instructors to manipulate the hierarchical directory structure.

Furthermore, it is another object of the present invention to efficiently to generate necessary directory without the need for the instructor or learner to manipulate the hierarchical directory structure.

The present invention receives a user's request to use a directory in a directory management method, locates the directory in question on the basis of time information for the user to be able use the located directory.

The directory management program of the present invention functions as a receiving means for a user's request to use a directory, as a locating means for locating the directory concerned on the basis of time information, and also as a display means on which the user uses the located directory.

According to the present invention, directories are specified automatically, so learners who have not the knowledge of the hierarchical directory structure, or instructors who have to designate many directories do not need to directly access the hierarchical directory structure. Thus file management of the present invention is easy.

According to the present invention, necessary directories can be generated efficiently without a direct access to the hierarchical directory structure by the instructors.

The objects, advantages and features of the present invention will be more clearly understood by referencing the following detailed disclosure and the accompanying drawings.

BRIEF DESCRIPTION OF THE DRAWINGS

FIG. 2A shows an example of student information database according to the present invention.

FIG. 2B shows an example of time table information database according to the present invention.

FIG. 2C shows an example of linkage information database according to the present invention.

FIG. 3A shows an example of time table alteration information database according to the present invention.

FIG. 3B shows an example of subject topic database according to the present invention.

FIG. 3C shows an example of directory information database according to the present invention.

FIG. 4 shows a flow chart of the processing of database generation according to the present invention.

FIG. 7A shows an example of a new-subject-student-topic generation screen according to the present invention.

FIG. 7B shows an example of a new-subject-student-topic generation screen according to the present invention.

FIG. 7C shows an example of a new-subject-student-topic generation screen according to the present invention.

FIG. 9 shows an example of a log-in screen.

FIG. 10 shows a flow chart of the processing for acquiring users and topics, and allocating directories.

DETAILED DESCRIPTION OF THE PREFERRED EMBODIMENTS

In the following, an embodiment of the present invention applied to educational institutions, such as elementary schools, junior and senior high schools, will be described. It should be noted, however, that the present invention can be applied not only to elementary schools, junior and senior high schools, but also to educational institutions as a whole, including colleges and universities, vocational and other miscellaneous schools, cram schools, in-house educational organizations a corporation, where lessons and lectures are given using computers.

Figure 1:
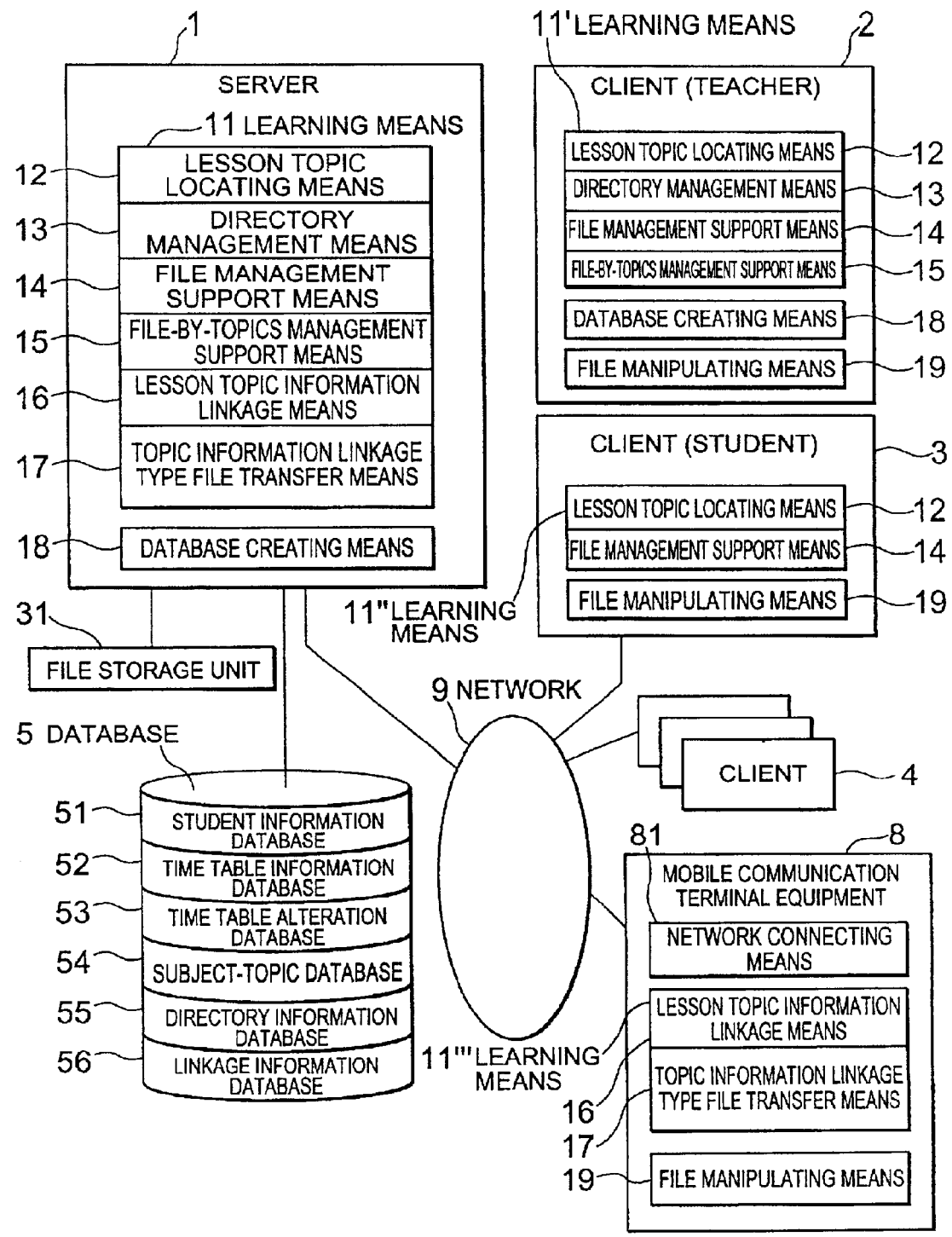
FIG. 1 shows an example of the system configuration according to the present invention.

FIG. 1 shows an example of the system configuration equipped with the devices according to the present invention. In FIG. 1, reference numeral 1 is a server computer, or server unit, numeral 11 is a learning means, 2 a client computer, or client unit, and numeral 11' is a configuration of the learning means used by instructors, including teachers. Numeral 3 is a client unit, and numeral 11" is a configuration of the learning means used by students. Numeral 4 is another client unit used by teachers or students (including elementary school children), numeral 5 is a database, and numeral 8 is a piece of mobile communication terminal equipment, such as a cellular phone hand set and a personal digital assistant, to use the learning system of the present invention by connecting to a network 9. Numeral 11'" is a configuration of the learning means for mobile communication terminal equipment. Although FIG. 1 shows the configuration of the system used by students as the mobile communication terminal equipment, the system used by the instructor includes a directory management means, a list generating means of file by topics, a database generating means in addition to the means shown in FIG. 1. The components of the learning means 11, 11', 11" and 11'" is shown as example in the leaning systems.

In the server unit 1, numeral 11 is a learning means, numeral 12 is a lesson topic locating means for specifying the grade, subject and topic of the lesson by referring to the student information database, the time table by classes information database, the time table alteration information database and the subject-topic database on the basis of the date of the student's log-in in a lesson and the student information.

Numeral 13 is a directory management means that is a directory management system which, upon registration of a new student, subject and topic of a new entry into the database of the student information, time table information, time table by classes information, time table alteration information, subject-topic databases, automatically generates a correlating directory on the server unit, and registers it in the directory information database.

Numeral 14 is a file management means that locates a directory to be used in the class as a standard based on specified subject-topics, and students. Further, for example according to directories of the subject-topics, students, classes and grades, multiple display regions (for example regions for "user," "class," and "grade,") are displayed on a screen as operating area. Further user can stores the files to the directories to which the classified areas are correlated by moving an item to the area on the screen.

Numeral 15 is a file-by-topics management support means that enables an administrator, such as a teacher, to refer the topic directory bellow the grade, class, individual student directories with the hierarchical directory structure by selecting a topic in the file management.

Numeral 16 is a lesson-topic information linkage means used in a learning activity in extra-curricular activities and other lessons where necessary files are referenced or stored through mobile communication terminal equipment. Registering the grade, subject and topic to which the learning activity belongs to link with the subject-topic information, it enables for user to file them in allocated multiple region (such as regions of a user, a class, a grade, etc.) on the screen Numeral 17 is a topic information linkage type file transfer means that, when transferring files onto the server unit from a mobile communication terminal equipment which is registered to the server, transfers those files by automatically locating a destination directory in accordance with the subject-topic information and the destination information to which the file is stored. Numeral 18 is a database creation means.

Numeral 5 is a database, numeral 51 is a student information database, numeral 52 is a time table information database, numeral 53 a time table alteration information database, numeral 54 is a subject-topic database, numeral 55 is a directory information database, and numeral 56 is a linkage information database (for holding the access information of the mobile communication terminal equipment). The contents of each database will be described later.

In the client unit (teacher) 2, numeral 11' is a learning means, 12 is a lesson-topic specifying means (the same as that described above), 13 is a directory management means that is the same as the aforementioned one. Numeral 14 is a file management support means that is the same as the aforementioned one, numeral 15 is a file-by-topic management support means that is the same as the aforementioned one, numeral 18 is a database creation means, numeral 19 is a file manipulation means for manipulating files, and numeral 31 is a file storage unit having an actual directory structure in which files are stored.

In the client unit (student) 3, numeral 11" is a learning means, numeral 12 is a lesson-topic locating means that is the same as the aforementioned one, numeral 14 is a file management support means that is the same as the aforementioned one, and numeral 19 is a file manipulating means.

In the mobile communication terminal equipment 8, numeral 11''' is a learning means, numeral 16 is a lesson-topic locating means that is the same as the aforementioned one, numeral 17 is a topic information linkage type file transfer means that is the same as the aforementioned one, and 19 is a file manipulating means.

FIG. 2A shows an example of student information database. FIG. 2B shows an example of time table information database. The time table information database 52 includes time-based time table information database 521 and subject-based time table information database 522. FIG. 2C shows an example of linkage information database. FIG. 3A shows an example of time table alteration information database. FIG. 3B shows an example of subject topic database. The subject topic information database 54 includes subject-based subject-topic information database 541 and topic-based subject-topic information database 542. FIG. 3C shows an example of directory information database. The directory information database 55 has labels and directory names representing their contents for each grade, class, subject, etc. The linkage information database 56 holds local directory (directory in the mobile communication terminal equipment) that is learning information and access information when the mobile communication terminal equipment 8 is connected to the network 9, and the unit ID of the mobile communication terminal equipment.

FIG. 4 is a flow chart of the database creation processing of the present invention (correating with the database creation means). In FIG. 4, S1 is the creation processing of the student information database, S2 is the creation processing of time-by-classes time table information database, S3 is the creation processing of the subject-topic database, S4 is the creation processing of the time table alteration information database, and S5 is the creation processing of the linkage information database.

The learning system of the present invention registers information (items) in these databases, other than the directory information database 55, from the terminal in accordance with the procedures shown in the flow chart of FIG. 4. When an item is registered in these databases, the learning system of the present invention automatically generates a directory correating with the item, and stores it in the database concerned.

Figure 5:
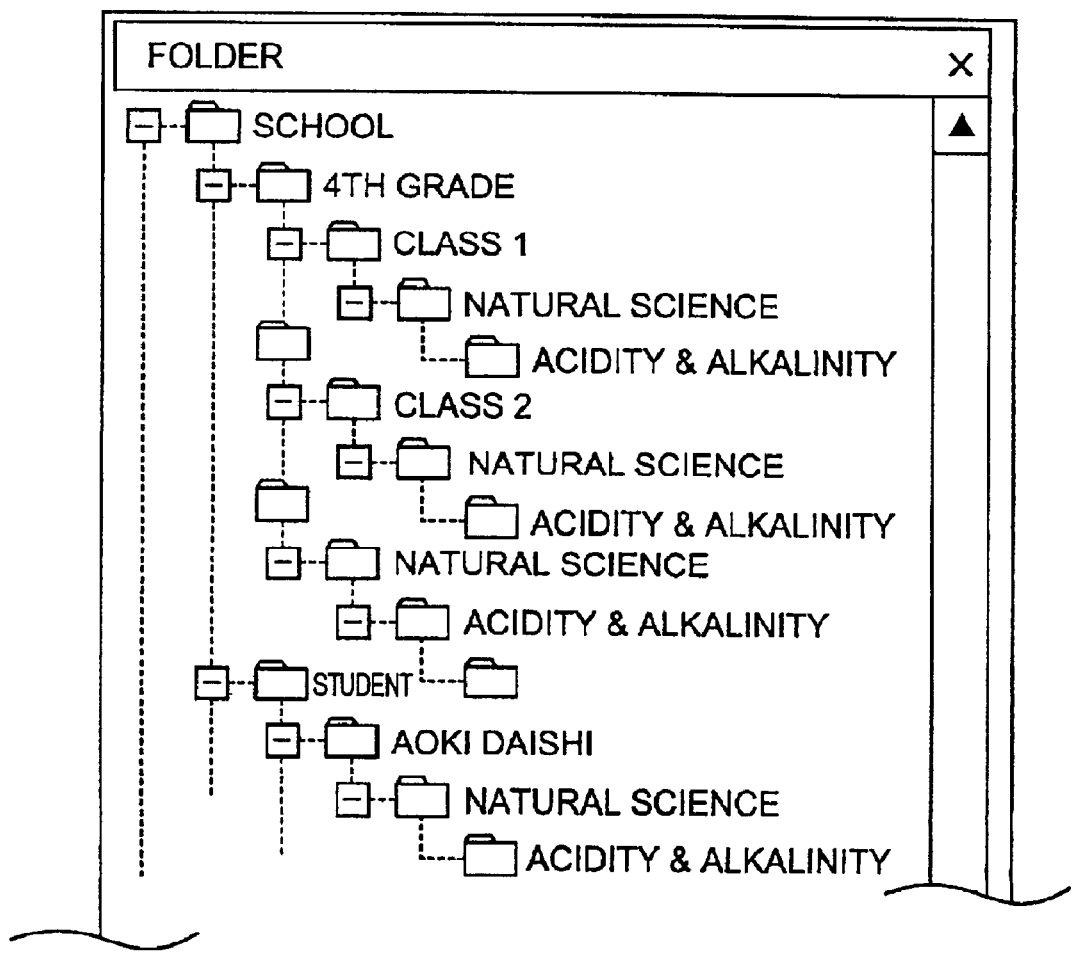
FIG. 5 shows an example of an apparent database structure display.
Figure 6:
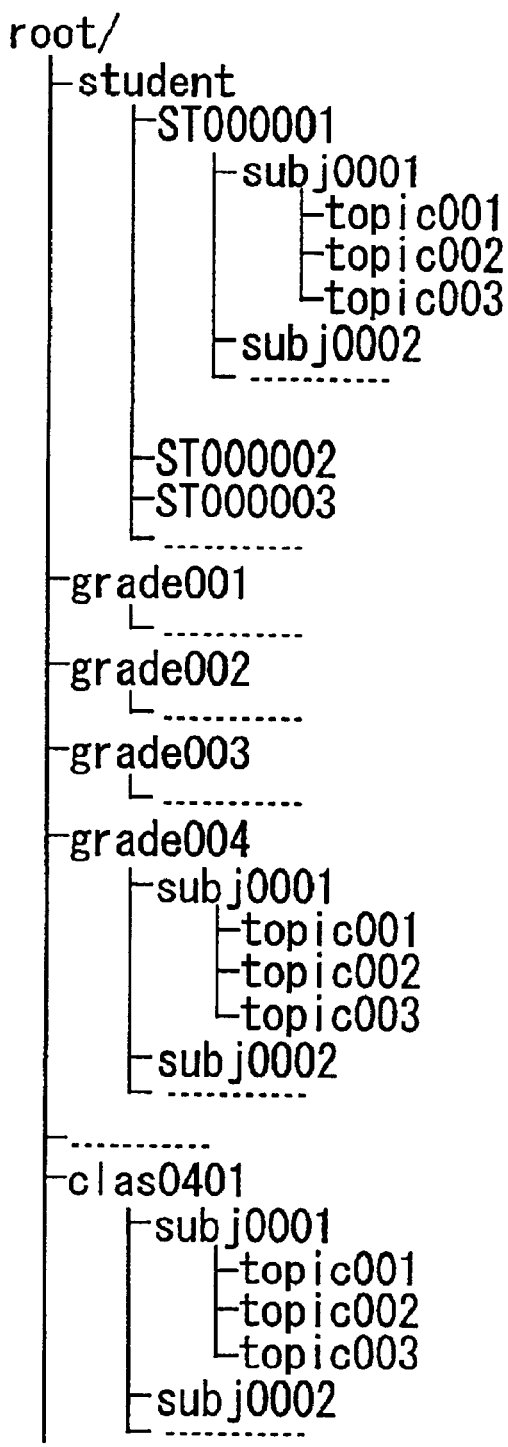
FIG. 6 shows an example of an actual database structure display.

FIG. 5 shows the hierarchical directory structure shown in FIG. 6 that is represented by labels (school, grade, class, subject, topic, etc.) indicating the roles in the actual learning activities. FIG. 6 shows a typical representation of an actual directory structure that is a hierarchical structure of the directories automatically generated on the server unit. In FIG. 6, node names, such as root (a node name of a school), student(a node name of a student), grade (a node name of a grade), class (a node name of a class), subj (a node name of a subject) and topic (a node name of a topic), and hierarchical relations are determined in advance. The learning system of the present invention, when an item is registered in a database from an input screen (which will be described later) shown in FIG. 7A,B or C, automatically generates a directory on the server unit, as shown in FIG. 6, and supports a learning activity using a computer network by displaying the directory represented by a label correlated to its role in the actual learning activities.

FIGS. 7A, B and C show an example of a new subject-student-topic creation screen that is an example of a registration screen for directory generation. FIG. 7A shows an example of screen for registering a subject, FIG. 7B shows an example of screen for registering a topic, and FIG. 7C shows an example of screen for registering a student. A new subject is registered by entering the name of the subject in accordance with instruction on the input screen of FIG. 7A, and the grade having that subject is selected. When registering a topic, the grade and subject are selected in accordance with FIG. 7B, and the name of the topic is entered. When registering a student, the grade and class are selected in accordance with the input screen shown in FIG. 7C, and the name of the student is entered.

As a result, a label is attached to each directory shown in FIG. 6, and an apparent directory structure is displayed as shown in FIG. 5.

Figure 8:
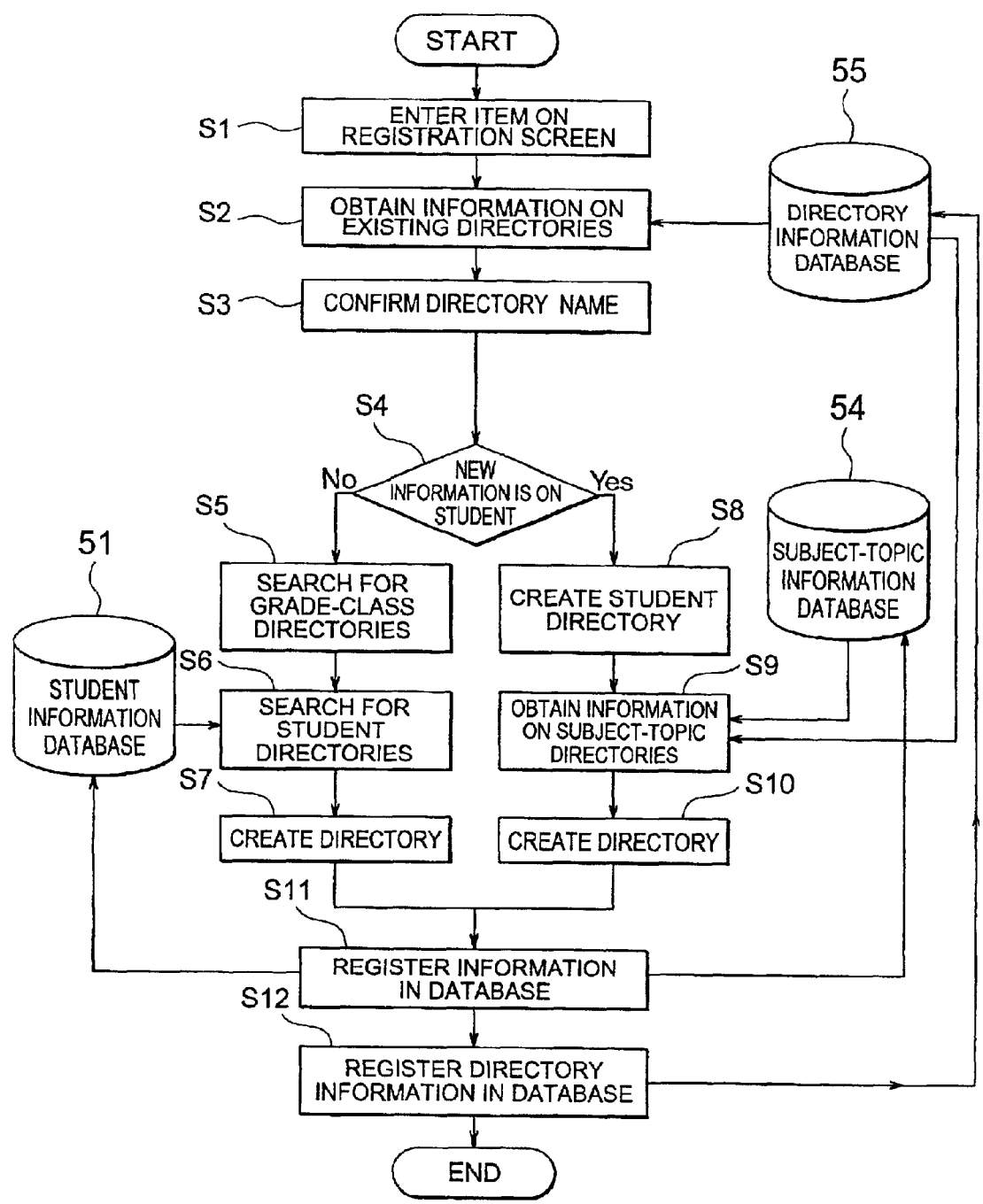
FIG. 8 shows a flow chart of the processing of directory generation.

FIG. 8 is a flow chart of directory generation processing (correating with the directory management means) for generating directories in accordance with the information input onto the input screen of FIG. 7A, B and C. In FIG. 8, numeral 55 is a directory information database, numeral 51 is a student information database, and numeral 54 is a subject-topic information database.

Now, assume that a teacher, for example, designates a topic on the input screen of FIG. 7B, selects "4th Grade" and "Natural Science" to register a new topic entitled "Acidity and Alkalinity." He also enters predetermined items onto the registration screen (S1). Then, existing directory information is obtained from the directory information database 55 (S2). The directory name comprises a character string and a serial number, a directory name for a topic may be "topic001," for example. In S3, the directory management means 13 acquires the number of the current topic directories by referencing the directory information database 55, and confirms a newly created directory name through count-up (if an existing directory has a name of "topic003," for example, the name of a new directory will be "topic004.") Next, whether the new information is concerned with students is judged in the judgement step S4 (to judge whether the new information is concerned with "Student" among the displayed items of "Subject," "Topic" and "Student" on the input screen of FIG. 7A,B or C). As the new information is not concerned with students in the current case, the processing proceeds from the judgement step S4 to S5. In S5, since the topic "Acidity and Alkalinity" belongs to the subject of "Natural Science" of the grade of "4th Grade," the directory information database 55 is searched for "4th Grade" directory and directories of classes belonging to that grade. Next, the student information database 51 is searched in S6 for student directories belonging to that grade, and then in S7 "Natural Science" directories below them are extracted. A new "topic004" directory is generated below the extracted directories. Finally, the topic information is registered in the subject-topic information database 54 (S11), and then the name and type (topic in the current case) and label ("Acidity and Alkalinity" in this case) of the newly generated directory are registered in the directory information database 55 (S12). To register a new subject directory, the same processing as that shown by the flow of S5~S7 is executed.

When registering a new student directory, the processing proceeds from the judgement step of S4 to S8 where a student directory is created (the name of the student directory has already been obtained in S3). The directory information database 55 is searched for subject-topic directory information (S9). These directories are created below the student directories (S10).

Next, the aforementioned processing of new topic creation will be described in more details. The flow of registering the "Acidity and Alkalinity" of "4th grade" and "Natural Science" on the screen of FIG. 7B will be described, referring to FIG. 8.

First, an existing directory is obtained from the directory information in the directory information database 55, where three topics are registered. The directory of "Natural Science" is named as "sunj0001."

A directory name of "topic004" is given to the "Acidity and Alkalinity" topic on the basis of the above information. Then, the directory information database 55 is searched for the "grad0004" directory for the 4th grade, and the directory "grad04xx" (xx is a serial number starting from 01) for each class of the 4th grade, and "subj0001" directories below these directories are extracted. Next, the "topic004" directory is registered below these "subj0001" directories. Then, the following topic data is registered. Assuming that the 4th grade has two classes each consisting of ten students, for example, one topic registration processing creates 1+2+(10×2)=23 "topin004" directories.

| No. | Grade | Subject | Topic Name | Start Date | End Date |
|---|---|---|---|---|---|
| — | 4 | Natural Science | Acidity & Alkalinity | Apr. 16, 2001 | Apr. 23, 2001 |

Next, the following directory information is registered.

| No. | Type | Label | Directory Name |
|---|---|---|---|
| — | Topic | Acidity & Alkalinity | topic004 |

Now, a more detailed example of the creation processing of a new student directory will be described in what follows. On the screen of FIG. 7C, a student named "Oki Yoshio" of "Class 1" of "4th Grade" is registered, as shown in the figure. The processing flow at this time will be described, referring to FIG. 8.

An existing directory named "STxxxxxx" is first acquired from the directory information contained in the directory information database 55 (S2). At this time, assume that 99 students have been registered in the database. Based on this information, a directory name of "ST000100" is given to "Oki Yoshio" (S3), and that directory is created (S8). The directory name "clas0401" for "Class 1, 4th Grade" is then extracted from the directory information database 55, and an actual directory structure is searched for this directory to extract the "subjxxxx" for all subjects and "topicxxx" for all topics below "clas0401" (S9). These extracted directories are generated below "ST000100." Next, the following student data is registered.

| No. | Family Name | Personal Name | Sex | Grade | Class | No. | User ID |
|---|---|---|---|---|---|---|---|
| — | Oki | Yoshio | Male | 4th | 1 | — | ST000100 |

Then, the following directory information is registered.

| No. | Type | Label | Directory Name |
|---|---|---|---|
| — | User | ST000100 | ST000100 |

FIG. 9 shows an example of the log-in screen. When a student logs in, the learning system of the present invention identifies the student himself, his class and grade from his log-in account, also identifies the subject and topic scheduled to be provided at that time from the date of log-in, and provides a screen from which access can be easily implemented to the directory correating with that topic (FIG. 11). FIG. 9 shows a screen for this log-in input.

FIG. 10 is a flow chart of the processing for acquiring users and topics, allocating directories to them, and displaying them on the screen (correating with the lesson topic specifying means and the file management support means 14). The flow chart of FIG. 10 shows the flow from a user's log-in on the screen of FIG. 9 till a file manipulating screen is displayed.

In FIG. 10, numeral 51 is a student information database, numeral 521 is a time-based time table information database and numeral 522 is a subject-based time table information database, numeral 53 is a time table alteration information database, numeral 54 is a subject-topic information database, numeral 55 is a directory information database, and numeral 20 is a system date-time information holding section.

In S1, authentication is carried out as a student logs on to the learning system by entering his user ID on the log-in screen of FIG. 9. In S2, the grade and class of the student is obtained from the student information database 51. Next, the date and time are acquired on the system by referencing the system date-time information holding section 20 in S3 to identify what class period it corresponds to from the time-based time table information database 522. Next, a subject is obtained from the time table alteration database 53 in S4, and judgement is made in S5 to determine whether the aimed subject has been obtained. If the subject has successfully been obtained, that subject is confirmed, and if not (that is, when the subject could not be obtained because there was no change in time table) the subject is obtained from the subject-based time table information database 522 in S6. Now that the subject has been identified, a topic to be allocated to the current date is obtained from the subject-topic information database 54 in S7. Then, directory names correating with each label of the grade, class, user and topic obtained in the foregoing procedures are obtained from the directory information database 55 in S8. Finally, regions (regions of user, class and grade shown in FIG. 11A) on the file manipulation screen are correlated to directories to create the relationship between the regions and the directories as shown in FIG. 11B, and the screen as shown in FIG. 11A is displayed.

Next, FIGS. 11A and B will be described. FIGS. 11A and B are diagrams explaining file manipulation according to the present invention. FIG. 11A shows an example of the file manipulation screen of this system. As shown in FIG. 11A, the regions of user, class and grade are displayed, to each of which a directory is allocated as shown in the flow chart of FIG. 10. FIG. 11B shows examples of actual directories and the labels other (user, class and grade) correating with each as a result of FIG. 11A. When displaying a school hour in which "Aoki Daishi of Class 1 of the 4th Grade" takes part in the learning of "Congruence of Figures" in arithmetic, the directory (topic002) correating with the "Congruence of Figures" topic below the directory (ST000001) correating with the user of "Aoki Daishi" is correlated to the "User" panel. Thereinafter, the (clas0401) directory of "Class 1 of the 4th Grade" to which Aoki Daishi belongs is correlated to the "Class" panel, and the (topic002) directory of "Congruence of Figures" below the (grade004) directory of "4th Grade" is correlated to the "Grade" panel.

Figures 11A, 11B:
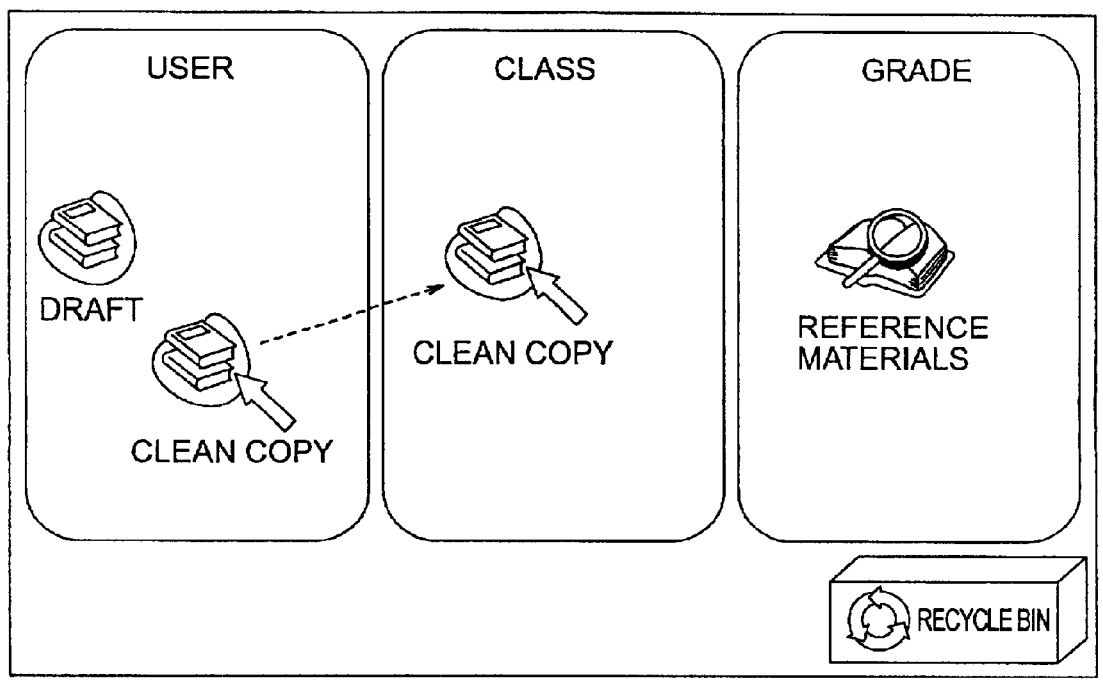
FIG. 11A shows explanation of file manipulation.
FIG. 11B shows an example of directories correating with the screen shown in FIG. 11A.

In FIG. 11A, "Draft" and "Clean Copy" of the "User" region are icons for files having the labels of "Draft" and "Clean Copy," and their directories are those of files created below the "ST000001/subj0001/topic003/" directory of "User" in FIG. 11B. "Clean Copy" in the Class region means that a file was created in the Class layer by dragging "Clean Copy" of the "User" region. A file having the label of "Clean Copy" is created in a layer below the Class directory. "Reference Book" in the Grade region indicates that the teacher, for example, created a file having the label of "Reference Book" below the "topic003" of the actual Grade directory.

In this way, the learning system of the present invention enables the user to reference the topic files belonging to grade, class and user on a single screen. The file can be stored in a directory allocated to each region by dragging and dropping the icon of the file to be stored into each region. Thus, the learning system of the present invention enables the user (student, teacher, etc.) to automatically open a plurality of currently related directories without the knowledge of the directory structure.

The flow of processing starting from the log-in screen in FIG. 9 to displaying the screen shown in FIG. 11A is as follows (refer to FIGS. 2A, B, C and 3 A, B, C). The learning system is logged in to access "ST00001" on the log-in input screen of FIG. 9. Now assume that log-in time is 8:52AM, Apr. 16, 2001 (Monday).

In FIG. 10, a student logs in on the log-in screen (S1). It is confirmed from the student information database 51 that this student belongs to Class 1 of the 4th Grade (S2). Next, it is confirmed that the log-in time falls upon the 1st period on Monday from the time-based time table information database 521 (S3). Then, subject information is acquired from the time table alteration information database 53 (S4). If the subject information cannot be acquired in S5, the processing then proceeds to S6 where the subject information is acquired from the sugject-based time table information database 522 (S6). Thus, it is confirmed that the lesson subject of the period in question is arithmetic. Next, it is confirmed that the topic of this day is "Congruence of Figures" from the topic information database 54 (S7). Furthermore, directories of "grade004," "clas0401" and "ST000001" are acquired from the directory information database 55 (S8). Now these directories are searched for "Congruence of Figures" directories (S9). With the above procedures, a list as given in FIG. 11B can be obtained. These directories are therefore allocated to the screen of FIG. 11A for display (S10).

The learning system of the present invention enables the teacher to select a topic on his terminal and acquire subdirectories of the topic from the directories of the Grade, Class and Student, and create a virtual directory structure by them , so that files can be viewed and manipulated under the hierarchical structure.

Figure 12:
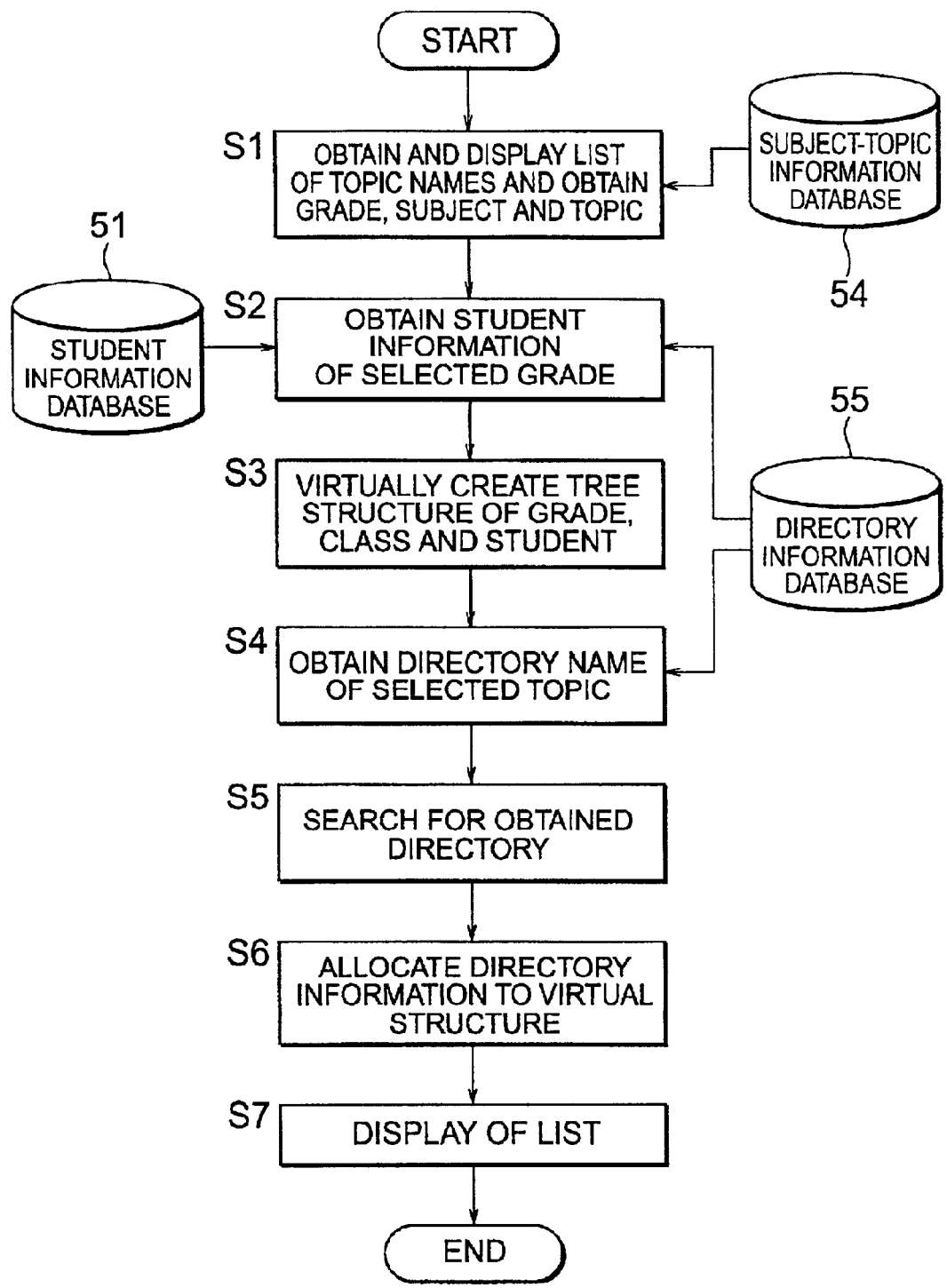
FIG. 12 shows a flow chart of the processing for generating topic-wise file display screens according to the present invention.
Figures 13A, 13B:
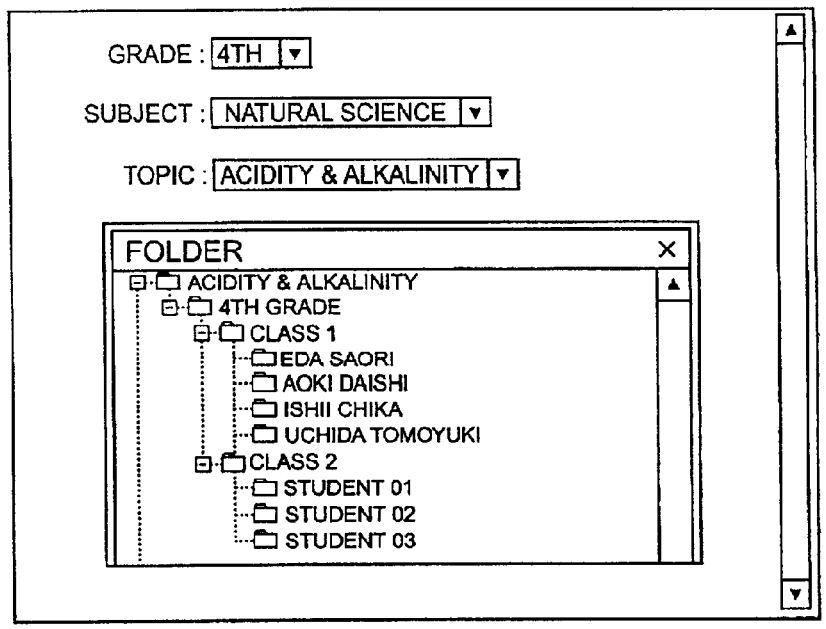
FIG. 13A shows explanation of file manipulation by topics according to the present invention.
FIG. 13B shows an example of directories correating with the tree structure shown in FIG. 13A.

FIG. 12 shows a flow chart (correating with the topic-wise file management support means 15) of file-by-topics display screen processing. FIGS. 13A and B show an example of file-by topics manipulation according to the present invention. FIG. 13A shows an example of the file-by-topics manipulation screen. FIG. 13B shows an example of directories correating with the tree structure shown in FIG. 13A. The processing from selecting a topic on the screen shown in FIG. 13A to displaying the directory structure as shown in the FIG. 13A is explained referring the flow chart shown in FIG. 12.

Now, the processing of correlating the file-by-topics manipulation screen of FIG. 13(a) to the directories shown in FIG. 13(b) will be described, following the flow shown in FIG. 12. The input screen of FIG. 13(a) is initially in the state where only "Grade" has a pull-down menu, while "Subject" and "Topic" are input-disabled. When the teacher selects "Grade" ("4th Grade" in the example shown in the figure) from among them, the file-by-topics management support means 15 references the subject-based subject-topic information database 541 which is included in the subject-topic information database 54, reads subjects (those subjects having a "1" flag) registered in the selected Grade, and displays selectable subjects with pull-down menus in the "Subject" area on the input screen. Furthermore, when the teacher selects a subject ("Natural Science" in the example shown in the figure) from the selectable subjects, the system reads the topics registered in the selected subject from the topic-based subject-topic information table 542 which is included in the subject-topic information database 54. The selected topics are displayed as the pull-down menu in the "Topic" area on the input screen. From these selectable topics, the teacher selects a topic ("Acidity and Alkalinity" in the example shown). With the aforementioned processing, the file-by-topics management support means 15 obtains the required information on grade, subject and topic (S1), and obtains information on students belonging to the grade in question by referencing the student information database 51 (S2). Then, the file-by-topics management support means 15 obtains information on the directories correating with the grade, class and subject, and on the directories correating with the selected topic below these directories from the directory information database 55, and virtually generates a grade-class-student structure having the grades and classes having the selected topic, on the basis of these pieces of information. The hierarchical structure virtually generated at this point of time is as shown in FIG. 13A, however the directories are not correlated with each other (S3).

Next, the directory correating with the selected topic is extracted (S4), and search is made for the directories obtained from the actual directory structure (FIG. 6) (S5). Those directories are correlated with the virtually generated tree structure (S6). The directory correating with the "Acidity and Alkalinity" topic below the actual 4th Grade, Class 1 directory is correlated with the "4th Grade-Class 1" folder on the directory list of FIG. 13A. Finally, the tree structure of the directories created the virtually is displayed in the form of the hierarchical structure on the screen, as shown in FIG. 13A. The correspondence between the directory structure shown in FIG. 13A and the actual directories is as shown in FIG. 13B.

Figure 14:
FIG. 14 shows an example of equipment information registration screen for mobile communication terminal equipment of the system according to the present invention.
Figures 15A, 15B:
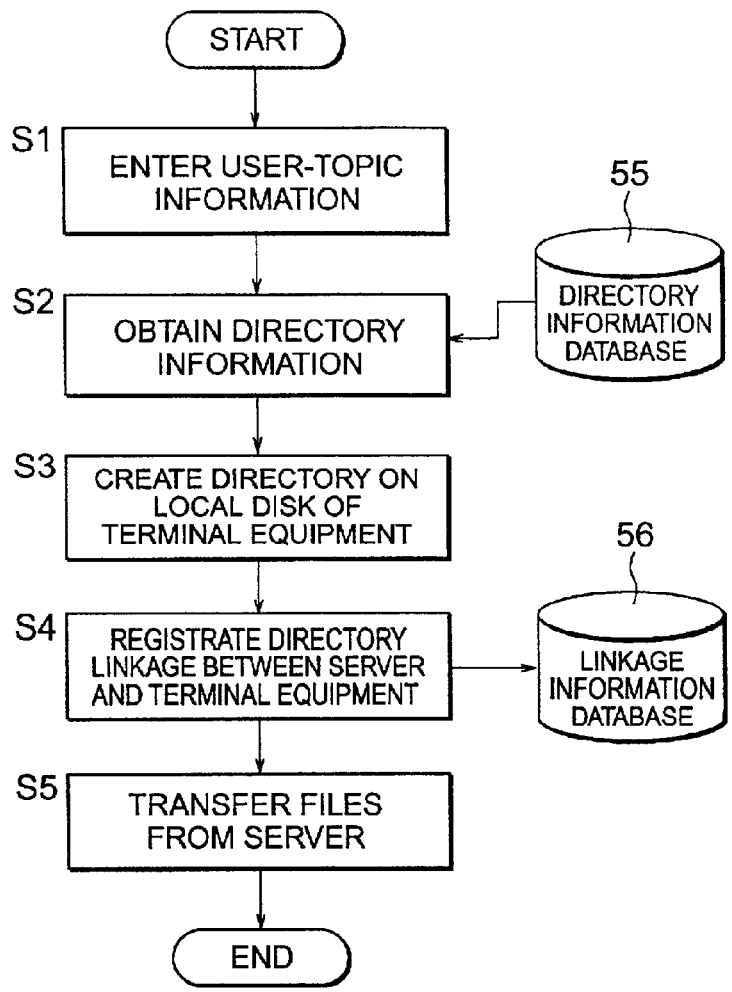
FIG. 15A shows explanation of a configuration for using mobile communication terminal equipment according to the present invention.
FIG. 15B shows an example of the correspondence of directories on the server with the mobile communication terminal equipment according to the present invention.

The learning system according to the present invention can be used by connecting mobile communication terminal equipment (refer to FIG. 1). FIG. 14 shows an example of the device information registration screen of the mobile communication terminal equipment connected to the learning system according to the present invention. FIG. 15A is a flow chart of the learning process using the mobile communication terminal equipment (which corresponds to the lesson topic information linkage means and the topic information linkage file transfer means).

When performing extra-curricular activities, a learning activity using the screen shown in FIG. 11A can be accomplished even in the stand-alone state by connecting the mobile communication terminal equipment to the server unit, registering linkage information, and creating directories on the mobile communication terminal equipment. After the learning activity, the data can be rewritten in the server unit by connecting again the mobile communication terminal equipment to the server unit.

The user who uses the mobile communication terminal equipment and the subject-topic to be learned are registered on the linkage information setting screen shown in FIG. 14. The flow from registering the information to linking directories and receiving files transferred from the server unit is shown in FIG. 15A. The user-topic information is entered on the input screen of FIG. 14 (S1). Next, in S2, on the basis of the user-topic information entered, directories are correlated with each region (User, Class, Grade) on the screen shown in FIG. 11A from a lesson topic information linkage means 16 (refer to FIG. 1). The detailed procedures of S2 are the same as shown in the flow chart of FIG. 10). Next, a directory having a fixed name is created on the local disk of the mobile communication terminal equipment, and subdirectories correating with the grade, class and user are generated below the directory (S3). Finally, the information on these directories and the ID of the terminal equipment are registered in the linkage information database 56, which are referred to FIGS. 1 and 2, (S4). Furthermore, files are transferred from the correlating directories on the server unit to the mobile communication terminal equipment (S5). The transfer is implemented with the topic information linkage type file transfer means 17 shown in FIG. 1.

FIG. 15B shows an example of the correspondence of directories on the server with the mobile communication terminal equipment according to the present invention.

Upon completion of learning using the mobile communication terminal equipment, file transfer processing can be carried out by connecting the mobile communication terminal equipment. This processing is accomplished by referencing the linkage information database for the correspondence between the directories in the linked server unit and the mobile communication terminal equipment as shown in FIG. 15B to obtain the name of the rewrite destination directory, and rewriting files in that directory. This processing is implemented by the topic information linkage type file transfer means 17 in FIG. 1. After files are transferred to the server unit, local files and directories in the mobile communication terminal equipment can be deleted.

In the foregoing, the present invention as applied to educational institutions, such as elementary schools, junior and senior high schools, has been described. Needles to say, however, the present invention can also be applied to universities and colleges, miscellaneous school, including vocational schools, in-house educational organizations of corporations, cram schools, and other educational institutions by altering the information (items) and display items on the screen representing the contents of databases to meet the specific details of educational institutions to which the present invention is applied.

The many features and advantages of the present invention are apparent from the detailed specification and, thus, it is intended by the appended claims to cover all such features and advantages of the invention which fall within the true spirit and scope of the invention. Further, since numerous modification and changes will readily occur to those skilled in the art, it is not desired to limit the invention to the exact construction and operation illustrated and described, and accordingly all suitable modification and equivalents falling within the scope of the invention may be included in the present invention.

What is claimed is:

1. A directory management method to manage directories representing regions for storing data in a computer system, where each directory is allocated to data corresponding to a lesson in which a user is enrolled, comprising:
    receiving a user's request to use a directory pertaining to a lesson;
    locating the directory based on a time information pertaining to the lesson in said request and enrollment information of the user; and
    providing the located directory to the user without requiring the user to indicate a hierarchical structure of the directory.

2. A directory management method as set forth in claim 1, wherein the directory is located by referencing alteration schedule information registered in a database.

3. A directory management method as set forth in claim 1, wherein when providing the located directory to said user, the directory is provided to said user with files stored in said directory.

4. A directory management method as set forth in claim 1, wherein when providing the located directory to said user, the directory is provided to said user in a customized hierarchical structure.

5. A directory management method as set forth in claim 4, further comprising:
    creating the located directory in a mobile communication terminal when said request to use the directory is presented via a mobile communication terminal connected with a network;
    correlating the located directory in accordance with the customized hierarchical structure; and
    transferring files in the located directory to the directory created in the mobile communication terminal.

6. A directory management method as set forth in claim 1, comprising:
    receiving a user's request to create a new directory, and
    creating the new directory, wherein a subdirectory is created within said new directory by referencing a subdirectory in another directory.

7. A directory management device to manage directories representing regions for storing data in a computer system, where each directory is allocated to data corresponding to a lesson in which a user is enrolled, comprising:
    a receiving unit for receiving a user's request to use a directory pertaining to a lesson;
    a locating unit for locating the directory based on time information pertaining to the lesson in the user's request and enrollment information of the user without requiring the user to indicate a hierarchical structure of the directory; and
    a display unit for displaying the located directory to enable the user to use the directory.

8. A directory management device as set forth in claim 7, wherein the display unit displays the directory to said user in a customized hierarchical structure.

9. A directory management method to manage directories representing regions for storing data in a computer system, where each directory is allocated to data corresponding to a lesson in which a user is enrolled, comprising:
    registering the user in a user information database indicative of lessons in which the user is enrolled;
    automatically linking the user information database of the user with a directory information database; and
    receiving a request to access a directory from the user, wherein the request to access the directory is processed in accordance with the linkage of the user information database of the user and the directory information database and the directory is provided to the user without requiring the user to indicate a hierarchical structure of the directory.

10. A directory management apparatus for managing directories representing regions for storing data in a computer system using directory management information in which each directory is allocated for data concerning a unit of curriculum of a corresponding lesson subject and the directories are hierarchically structured, the apparatus comprising:

- a student information storing unit for storing student information including information in relation to identification, grade, and class of a student;
- a time table information storing unit for storing time table information setting a lesson subject to be rolled in a class by day of week and a prescribed period of each class;
- a curriculum information storing unit for storing curriculum-subject information including a unit of curriculum of a lesson subject and a curriculum term when the unit of curriculum should be rolled;
- a log-in information obtaining unit for obtaining a log-in time and a day when the student is logged in the computer system;
- a grade and class information obtaining unit for obtaining the information in relation to the grade and class to which the student user belongs from the student information;
- a lesson subject obtaining unit for obtaining the lesson subject rolled in the class of the student from the time table information and the log-in time and day;
- a curriculum information obtaining unit for obtaining the unit of curriculum of the lesson subject from the curriculum-subject information;
- a directory retrieving unit for retrieving the directory allocated to the obtained unit of curriculum from the directory management information; and
- a display processing unit for displaying a field connected with the retrieved directory for data storage manipulation.

11. A directory management apparatus as set forth in claim 10, further comprising a directory generating unit generating and allocating a new directory to the obtained unit of curriculum when no directory to the obtained unit of curriculum is allocated in the directory management information.

12. The directory management apparatus as set forth in claim 11, wherein the directory generating unit, when no directory to the obtained unit of curriculum is allocated and a plurality of directory hierarchies are formed in the directory management information, individually generates and allocates a new directory to each obtained unit of curriculum in directory hierarchy; and the display processing unit displays a plurality of fields connected with each retrieved directory for data storage manipulation.

13. The directory management apparatus as set forth in claim 10, wherein, when a plurality of directories are allocated to the same unit of curriculum and each directory is individually located in different domains in the directory management information, the directory retrieving unit retrieves all directories allocated to the obtained unit of curriculum from the directory management information; and the display processing unit displays a plurality of fields connected with each retrieved directory for data storage manipulation.

14. The directory management apparatus as set forth in claim 13, wherein the directory management information includes domains representing each directory hierarchy formed by student, class or lesson subject.

15. A directory management method for managing directories representing regions for storing data in a computer system using directory management information in which each directory is allocated for data concerning a unit of curriculum of a corresponding lesson subject and the directories are hierarchically structured, the method comprising:

- accessing student information including information in relation to identification, grade, and class of a student, table information setting a lesson subject to be rolled in a class by day of week and a prescribed period of each class and curriculum-subject information including a unit of curriculum of a lesson subject and a curriculum term when the unit of curriculum should be rolled;
- obtaining a log-in time and a day when the student is logged in the computer system;
- obtaining the information in relation to the grade and class to which the student belongs from the student information;
- obtaining the lesson subject rolled in the class in which the student belongs from the time table information and the log-in time and day;
- obtaining the unit of curriculum of the lesson subject from the curriculum-subject information;
- retrieving the directory allocated to the obtained unit of curriculum from the directory management information; and
- displaying a field connected with the retrieved directory for data storage manipulation.

16. A computer accessible storage medium for recording a program causing a computer to perform a directory management for managing directories representing regions for storing data in a computer system using directory management information in which each directory is allocated for data concerning a unit of curriculum of a corresponding lesson subject and the directories are hierarchically structured, the program executing operations comprising:

- storing student information including information in relation to identification, grade, and class of a student;
- storing time table information setting a lesson subject to be rolled in a class by day of week and a prescribed period of each class;
- storing curriculum-subject information including a unit of curriculum of a lesson subject and a curriculum term when the unit of curriculum should be rolled;
- obtaining a log-in time and day when the student user is logged in the computer system;
- obtaining the grade and class to which the student user belongs from the student information;
- obtaining the lesson subject rolled in the class of user student from the time table information and the log-in time and day;
- obtaining the unit of curriculum of the lesson subject from the curriculum-subject information;
- retrieving the directory allocated to the obtained unit of curriculum from the directory management information; and
- displaying a field connected with the retrieved directory for data storage manipulation.

* * * * *

UNITED STATES PATENT AND TRADEMARK OFFICE
CERTIFICATE OF CORRECTION

PATENT NO. : 6,929,477 B2  
DATED : August 16, 2005  
INVENTOR(S) : Daichi Fukushima It is certified that error appears in the above-identified patent and that said Letters Patent is hereby corrected as shown below:

<u>Title page,</u>
Item [57], ABSTRACT,
Line 4, after "Network" delete "." and insert -- , --.

<u>Column 12,</u>
Line 38, after "based on" insert -- a --.

Signed and Sealed this

Sixteenth Day of May, 2006

JON W. DUDAS
*Director of the United States Patent and Trademark Office*